UNITED STATES PATENT OFFICE.

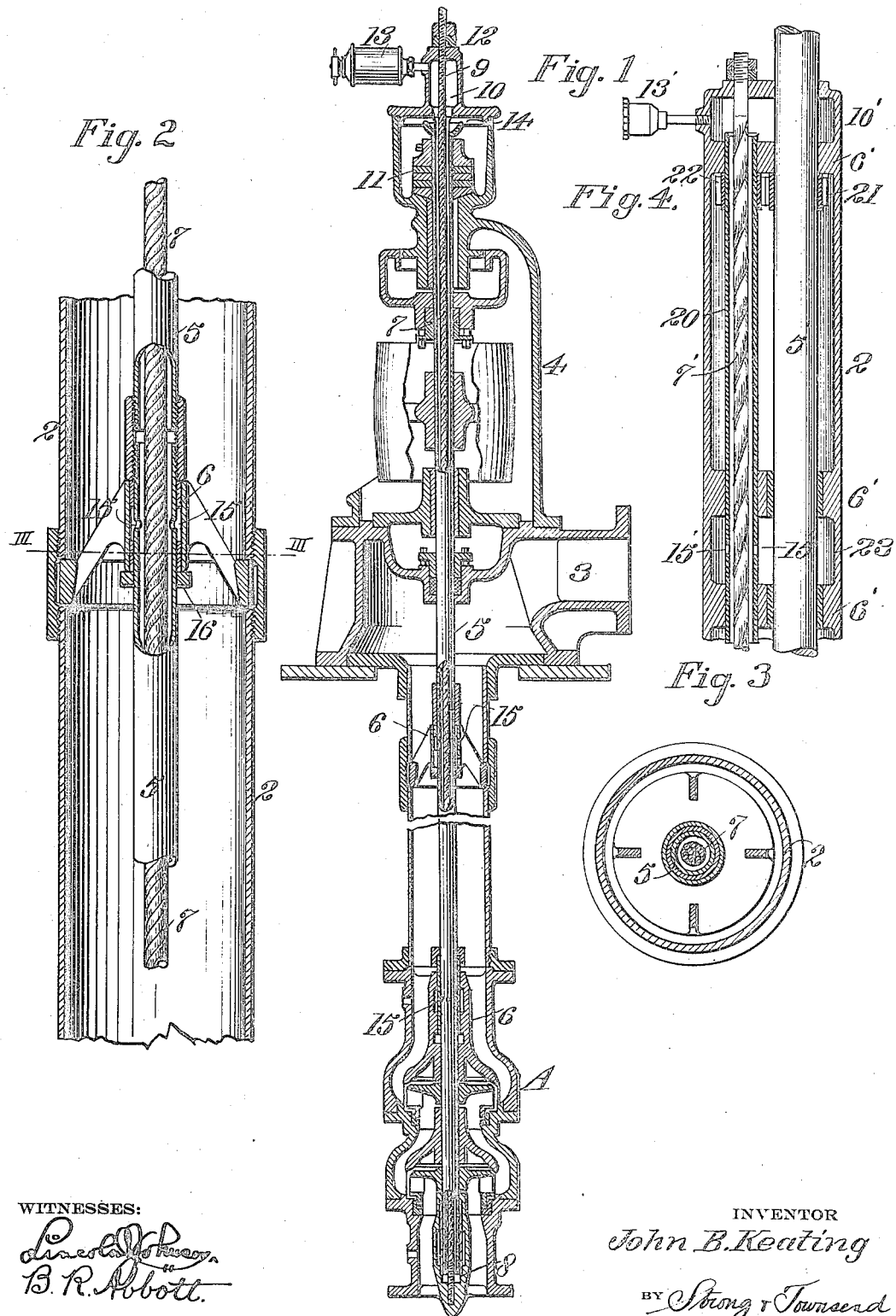

JOHN B. KEATING, OF OAKLAND, CALIFORNIA.

LINE-SHAFT LUBRICATOR.

1,253,837.

Specification of Letters Patent. Patented Jan. 15, 1918.

Application filed July 19, 1916. Serial No. 110,084.

*To all whom it may concern:*

Be it known that I, JOHN B. KEATING, a citizen of the United States, residing at Oakland, in the county of Alameda and State of California, have invented new and useful Improvements in Line-Shaft Lubricators, of which the following is a specification.

This invention relates to a line-shaft lubricator.

The object of the present invention is to provide a simple means for lubricating inaccessible bearings of shafts and is particularly applicable to driving-shafts of well pumps, embodying features for forcing lubricants, such as tallow or grease, positively and automatically to each bearing, thus assuring a uniform supply at each point of issue.

The invention is applicable both to solid and to hollow shafts, and it consists of parts and combinations as hereinafter described, illustrated and claimed.

The invention consists of the parts and the construction and combination of parts as hereinafter more fully described and claimed, having reference to the accompanying drawings in which—

Figure 1 is a vertical central section of a centrifugal deep well pump, showing the application of the invention.

Fig. 2 is an enlarged vertical section of the impeller shaft and one of the bearings.

Fig. 3 is a cross section on line 3—3, Fig. 2.

Fig. 4 illustrates a modification of the device by employing the same generic idea to the indirect lubrication of bearings of solid shafts.

Referring to the drawings in detail, A indicates in general, a deep well pump of the centrifugal type; 2 the discharge casing; 3 the discharge elbow; 4 the pulley frame; 5 the impeller shaft and 6 the shaft bearings.

The impeller shaft employed in the present instance is hollow and extending through said shaft from end to end is a cable or wire rope or screw-threaded rod, twisted steel or polygonal bar indicated at 7, providing in effect a continuous spiral member to carry forward or downward the lubricant to the various points or parts needing lubrication. Cable 7 is secured in any suitable manner at one end in the lower bearing of the pump A, as indicated at 8, while the upper end is secured to a threaded rod 9, which extends through a chamber 10 formed in a cap which forms a closure for the casing surrounding the thrust bearing 11; a pair of nuts 12 screwed on the upper end of the rod permits the tension of the rope to be adjusted. Mounted on the casing, and communicating with the chamber 10 is a force feed lubricator 13, commonly known as a grease cup. This cup when filled, discharges into the chamber 10 and the grease is thus permitted to enter the upper end of the hollow shaft, indicated at 14. The grease is here acted upon by the screw feed action produced by the spiral-wound rope and the revolving shaft surrounding the same, and is therefore forced in a downward direction to the several bearings 6, for the purpose of lubricating the same, the grease being admitted to the bearings through perforations 15 formed in the hollow shaft wherever it passes through bearings that it is desired to lubricate.

The invention is particularly applicable for the purpose of lubricating the bearings 6 which are mounted between the casing sections employed in connection with deep well pumps. These bearings are very inaccessible and have proved to be a constant source of trouble. The device here shown for feeding a heavy lubricator such as grease or tallow to the several bearings is a great improvement over any lubricating mechanism heretofore employed, as it forces the grease through the perforations 15 directly into the bearings, under sufficient pressure to prevent admission of grit or water to the bearings. In actual practice, it has been found desirable to secure a sand collar 16 on the shaft above and below each bearing end. These collars deflect the upwardly rising water discharging through the casing 2, to such an extent that any sand or grit that might be carried in suspension, is prevented from entering the bearings.

The mechanism above described is for the direct lubrication of bearings for hollow, vertical shafts, but it is obvious that the shaft need not be vertical.

Fig. 4 illustrates a modification of the device by employing the same generic idea to the indirect lubrication of bearings of solid shafts. Thus, 5' denotes a solid shaft with bearings 6'. Parallel to said shaft 5' is a hollow revoluble tube 20 which is driven from shaft 5' by means of gears 21 and 22, or in any other suitable manner. Inside of said tube 20 is a cable or a threaded rod 7', held in tension by suitable means not shown. The shaft bearings 6' are drilled to form bearings also for the hollow lubricating-tube 20. The latter has small holes 15' communicating with grease-chamber 23 through which passes the shaft 5'. At the top of tube 20 is located a grease-chamber 10' which receives the lubricant by a compression-cup 13' or by any other arrangements.

In operation, the lubricant is fed downwardly, screw-fashion by the revolution of tube 20 to lubricating chambers 23 around shaft 5' and to the bearings of the latter.

The materials and finish of the several parts of the lubricating mechanism may otherwise be such as the experience and judgment of the manufacturer may dictate.

It is understood that various changes in form, proportions and minor details of construction may be resorted to within the scope of the invention, without departing from the principle thereof, and that I do not purpose to limit myself to the specific design and construction here shown.

Having thus described my invention, what I claim and desire to secure by Letters Patent is—

1. In combination with a shaft and its bearings of a screw feeding device extending parallel with the shaft and delivering a lubricant to the several bearings, said device including a tubular member and a stationary screw member, the tubular member having communication with the several bearings to be lubricated and means for rotating the tubular member about the stationary screw member to force the lubricant into the bearings.

2. A lubricating device for shaft bearings, comprising a stationary cable and a tubular rotatable inclosure therefor, said tubular inclosure having openings by which the lubricant is delivered from the rotating tubular inclosure to the bearings to be lubricated.

3. The combination with a series of bearings to be lubricated, of a stationary spiral member, a rotating tubular member incasing the spiral member, said tubular member having communication with the several bearings by which the lubricant is delivered thereto.

4. The combination with a line shaft and bearings for the same, of means for delivering a heavy lubricant to one end of the shaft, and a member extending through the shaft having a spiral groove adapted to coöperate with the revolving shaft to force the lubricant through the shaft to the individual bearings.

5. The combination with a perforated hollow line shaft of bearing members surrounding the perforated parts of the shaft, and a member extending through the shaft having spiral shaped members formed thereon, adapted to coöperate with the shaft to force the lubricant through the shaft and the perforations formed therein to lubricate the bearings.

6. The combination with a perforated hollow line shaft of bearing members surrounding the perforated parts of the shaft, means for delivering a heavy lubricant to one end of the shaft, and a spiral-wound rope extending through the shaft adapted to coöperate with the shaft to force the lubricant through the shaft and out through the perforations formed therein to lubricate the bearings.

7. The combination with a hollow impeller shaft and bearings in a deep well centrifugal pump, of means for delivering a heavy lubricant to the upper end of the shaft, and a spiral-wound rope extending through the shaft adapted to coöperate with the same to force the lubricant down through the shaft and through perforations formed in the shaft which communicate with the bearings.

8. The combination with a hollow impeller shaft and bearings in a deep well centrifugal pump, of means for delivering a heavy lubricant to the upper end of the shaft, and a spiral-wound rope extending through the shaft adapted to coöperate with the same to force the lubricant down through the shaft and through perforations formed in the shaft which communicate with the bearings, means for securing the rope at the lower end of the shaft, and means for securing and adjusting the tension of the rope at the upper end of the shaft.

9. The combination with a hollow impeller shaft and bearings in a deep well centrifugal pump, of means for delivering a heavy lubricant to the upper end of the shaft, a spiral-wound rope extending through the shaft adapted to coöperate with the same to force the lubricant down through the shaft and through perforations formed in the shaft which communicate with the bearings, and a sand collar secured on the shaft above and below each bearing.

10. The combination of a hollow shaft, bearings for the same, an internal stationary member within the shaft, said internal member and the interior of the shaft forming a spiral channel for the downward passage of the lubricant, the hollow shaft having openings opposite the bearings by which the lubricant is delivered to the bearings by the rotative movement of the shaft.

11. A lubricating device for shaft bearings, comprising a revoluble tube surrounding a stationary member with helical grooves or twists to advance lubricant, and bearings which communicate locally with said tube.

In testimony whereof I have hereunto set my hand in the presence of two subscribing witnesses.

JOHN B. KEATING.

Witnesses:
H. J. ELLEN,
E. L. OSBORN.